US011878564B2

United States Patent
Migliori et al.

(10) Patent No.: US 11,878,564 B2
(45) Date of Patent: Jan. 23, 2024

(54) VEHICLE SUSPENSION LINK DEVICE AND SYSTEM, AND WORK VEHICLE WITH SUCH SYSTEM

(71) Applicant: KUBOTA CORPORATION, Osaka (JP)

(72) Inventors: Andrea Migliori, Crepy-en-Valois (FR); Sebastien David, Crepy-en-Valois (FR); Masatoshi Iwamoto, Crepy-en-Valois (FR)

(*) Notice: Subject to any disclaimer, the term of this patent is extended or adjusted under 35 U.S.C. 154(b) by 0 days.

(21) Appl. No.: 17/888,631

(22) Filed: Aug. 16, 2022

(65) Prior Publication Data
US 2023/0067438 A1 Mar. 2, 2023

(30) Foreign Application Priority Data
Aug. 25, 2021 (EP) .................. 21306151

(51) Int. Cl.
*B60G 7/00* (2006.01)

(52) U.S. Cl.
CPC .......... B60G 7/001 (2013.01); *B60G 2200/31* (2013.01); *B60G 2200/341* (2013.01); *B60G 2204/4302* (2013.01); *B60G 2300/09* (2013.01); *B60G 2400/05162* (2013.01)

(58) Field of Classification Search
CPC ............. B60G 7/001; B60G 2200/31; B60G 2200/341; B60G 2204/4302; B60G 2300/09; B60G 2400/05162
See application file for complete search history.

(56) References Cited

U.S. PATENT DOCUMENTS

| | | | | |
|---|---|---|---|---|
| 2,083,609 A | * | 6/1937 | Lefevre | F16F 1/36 403/56 |
| 5,165,306 A | * | 11/1992 | Hellon | B60G 21/0551 403/56 |
| 5,615,967 A | * | 4/1997 | Hellon | F16C 11/0642 403/56 |
| 5,795,092 A | * | 8/1998 | Jaworski | B60G 7/003 403/56 |
| 10,532,624 B2 | | 1/2020 | Norton et al. | |
| 2012/0319366 A1 | | 12/2012 | Yagiela | |

FOREIGN PATENT DOCUMENTS

| | | |
|---|---|---|
| DE | 102005041045 A1 | 3/2007 |
| EP | 2202140 B1 | 10/2010 |
| KR | 20190084486 A | 7/2019 |

OTHER PUBLICATIONS

English language abstract of KR 20190084486 A.
English language abstract of DE 102005041045 A1.

* cited by examiner

*Primary Examiner* — Paul N Dickson
*Assistant Examiner* — Shams Dhanani
(74) *Attorney, Agent, or Firm* — Cabinet Beau de Lomenie; Brian Gordaychik

(57) ABSTRACT

A vehicle suspension link device including a link element with a first and a second connection locus, for connection of the link element to a vehicle support structure and to a vehicle axle respectively, and a sensor element for detecting a movement of the link element, the sensor element being attached to the link element at an attachment point located on a virtual straight axis joining the first connection locus and the second connection locus.

14 Claims, 4 Drawing Sheets

VEHICLE SUSPENSION LINK DEVICE AND SYSTEM, AND WORK VEHICLE WITH SUCH SYSTEM

FIELD

The present disclosure relates generally to the field of vehicle suspension links. More specifically, the disclosure relates to a vehicle suspension link device including a link element and a sensor element for detecting a movement of the link element. The disclosure also relates to a vehicle suspension system including such a suspension link device and an angular sensor to which the sensor element is connected. The disclosure also relates to a work vehicle including such vehicle suspension system.

BACKGROUND

A vehicle suspension link device typically includes a link element with a first and a second connection locus, for connection of the link element to a vehicle support structure and to a vehicle axle respectively. The vehicle support structure is in particular a chassis or a body of the vehicle, or else an undercarriage or a frame of the vehicle. In a vehicle suspension system, the link element, also referred to as "panhard link", acts to prevent or restrain movement of the axle in directions other than in a vertical or substantially vertical plane. In particular, the link element, which usually extends transversely to the vehicle front-back direction, prevents or contributes to prevent that the wheels attached to the axle move laterally, that is side-to-side, or frontward and rearward with respect to the vehicle support structure.

In the present disclosure, the terms "frontward," "rearward," "transverse", "side," "upper," and "lower" may be understood relative to a direction in which the vehicle, on which the suspension link device is mounted, is travelling.

A link element may be associated with a sensor for detecting and measuring a movement of the axle. Such sensor is in particular for measuring movements of the axle in a given direction, in particular a vertical direction. In some circumstances, in particular in case the vehicle is a work vehicle, such as a tractor or the like, intended to travel on uneven ground and potentially subject to heavy stresses, there is a risk for the link element to be subject to undesired movements which might adversely affect accuracy of the measurement made by the sensor. Also, the suspension link system may be deliberately mounted so as to allow a small extent of "unwanted movements". For example, in a work vehicle, the vehicle axle may be connected to a rocker arm with a pivot point around a transverse axis, and a rotation of the rocker arm causes the axle to rotate around the pivot point, thus causing a 3D movement of the link element.

SUMMARY

The present disclosure aims at avoiding or at least substantially limiting the risks that an undesired movement of the link element be erroneously taken into account by the sensor in the measurement of the axle movement that the sensor aims at measuring.

Accordingly, the present disclosure provides a vehicle suspension link device including a link element with a first and a second connection locus, for connection of the link element to a vehicle support structure and to a vehicle axle respectively, and a sensor element for detecting a movement of the link element, the sensor element being attached to the link element at an attachment point located on a virtual straight axis joining the first connection locus and the second connection locus.

When the link element is attached to the vehicle support structure and to the vehicle axle, respectively, undesired movements of the link element may include rotational movements about the virtual axis joining the first connection locus and the second connection locus. However, since the attachment point of the sensor element is arranged on such virtual axis, a movement of the link element about the virtual axis would not cause the attachment point to move. Accordingly, such undesired movements would not affect the sensor element, so that they would not be taken into account in the measurements of the sensor to which the sensor element is configured to belong.

Optionally, the attachment point is located between the first connection locus and the second connection locus.

Optionally, the sensor element is a transmitting sensor element caused to move due to a movement of the link element and configured to be connected to a receiving sensor element for transmitting a movement of the transmitting sensor element to the receiving sensor element.

Optionally, the vehicle suspension link device includes a bracket secured to the link element, the attachment point being located on the bracket.

Optionally, the link element presents an arcuate shape.

Optionally, the link element is configured to be connected to the vehicle support structure and to the vehicle axle, respectively, via respective first and second spherical bearings, respective centers of the first and second spherical bearings defining the first and the second connection locus, respectively.

Optionally, the sensor element is connected to the link element via a third spherical bearing, the attachment point of the sensor element being at a center of the third spherical bearing.

The disclosure also provides vehicle suspension system including a vehicle suspension device according to the disclosure, and an angular sensor for detecting a movement of the link element, the sensor element being connected to the angular sensor.

Optionally, the sensor element is a sensor rod, connected to the angular sensor by a linkrod, and the angular sensor is configured to measure an angular movement of the linkrod.

The disclosure also provides a work vehicle including a vehicle support structure, a vehicle axle and a vehicle suspension system according to the disclosure, the link element being connected to the vehicle support structure at the first connection locus and being connected to the vehicle axle at the second connection locus.

BRIEF DESCRIPTION OF THE DRAWINGS

Aspects of an embodiment will be described in reference to the drawings, where like numerals reflect like elements.

DETAILED DESCRIPTION

Figure 1:
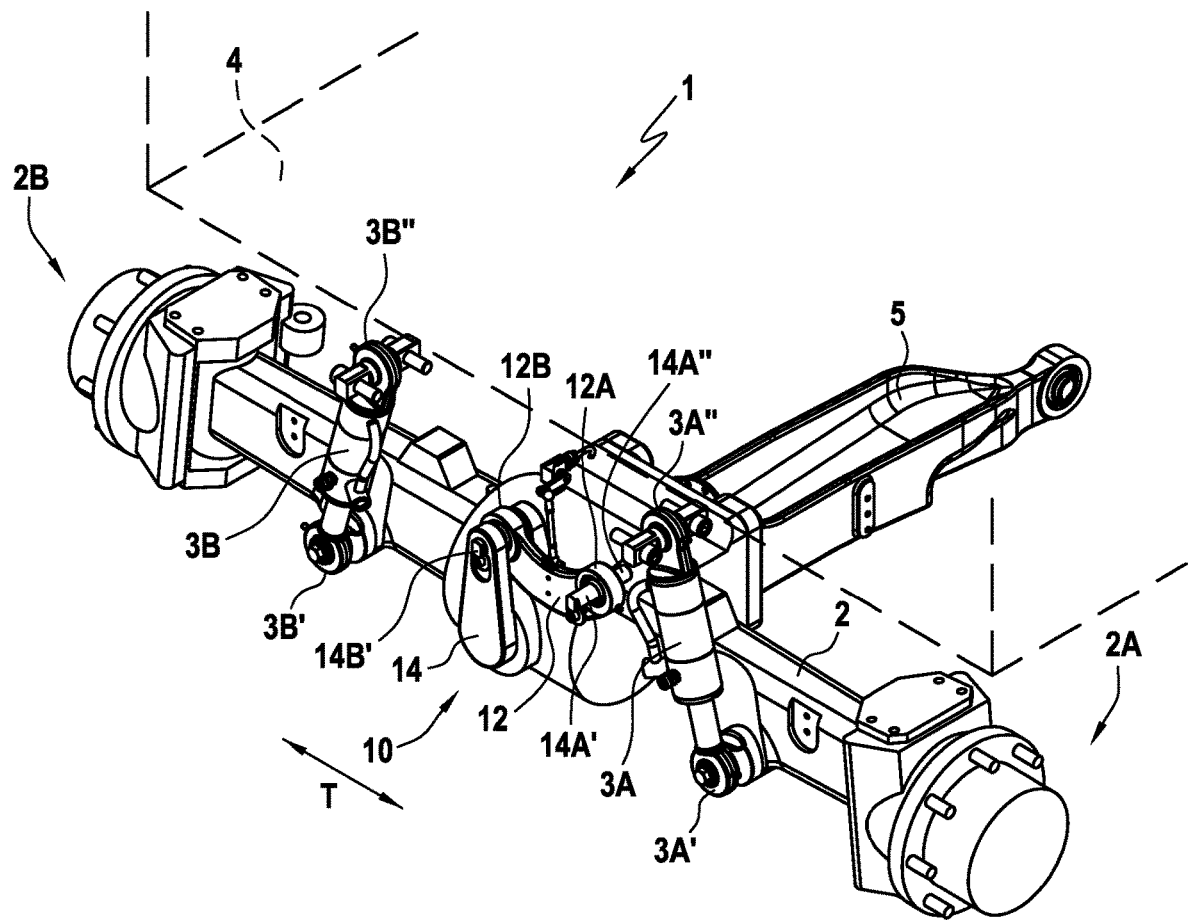
FIG. 1 is a perspective view of a vehicle suspension system, implementing the vehicle suspension link device of the disclosure.

An embodiment of a vehicle suspension link device according to aspects of the disclosure will now be described with reference to the figures. Although the device is described with reference to a specific example, it should be understood that modifications and changes may be made to this example without going beyond the general scope as defined by the claims. Consequently, the description and the drawings should be considered in a sense that is illustrative rather than restrictive. The figures, which are not necessarily to scale, depict illustrative aspects and are not intended to limit the scope of the disclosure. The illustrative aspects depicted are intended only as exemplary.

While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the claims.

Additionally, the language used herein has been principally selected for readability and instructional purposes, and may not have been selected to delineate or circumscribe inventive subject-matter. Accordingly, the disclosure of the present disclosure is intended to be illustrative, but not limiting, of the scope of the disclosure, which is set forth in the claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

Figure 2:
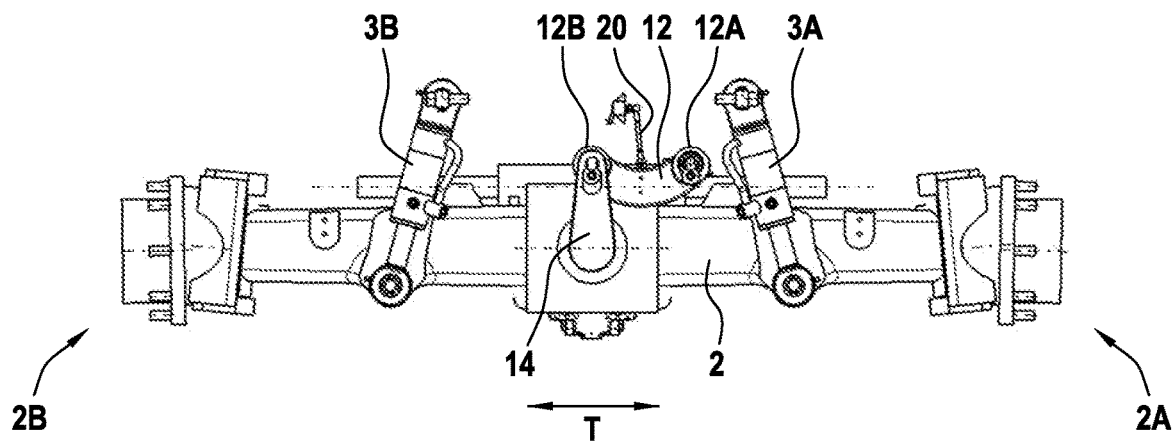
FIG. 2 is a front view of the vehicle suspension system of FIG. 1.

FIGS. 1 and 2 show a vehicle suspension system 1 including an axle 2 extending generally in a vehicle transverse direction T. The lateral ends of the axle 2 are provided with mounts 2A and 2B for mounting wheels. In particular, the axle may be an axle for steering wheels. The suspension system includes suspension dampers 3A, 3B such as hydraulic cylinders, connected to the axle 2, at their respective ends 3A' and 3B', while their respective ends 3A" and 3B" are configured to the connected to a vehicle support structure 4 (shown in phantom line), such as a chassis or a body of the vehicle, or an undercarriage or a frame of the vehicle. The axle is fixed to a longitudinal rocker arm 5 of the vehicle.

The vehicle suspension system includes a suspension link device 10, which includes a link element 12, generally oriented in the vehicle transverse direction T. A first end 12A of the link element 12 is configured to be connected to the vehicle support structure. A second end 12B of the link element 2 is connected to the axle 2 via brackets 14. In the example, two brackets 14 are provided, between which the end 12B is sandwiched.

Figure 3:
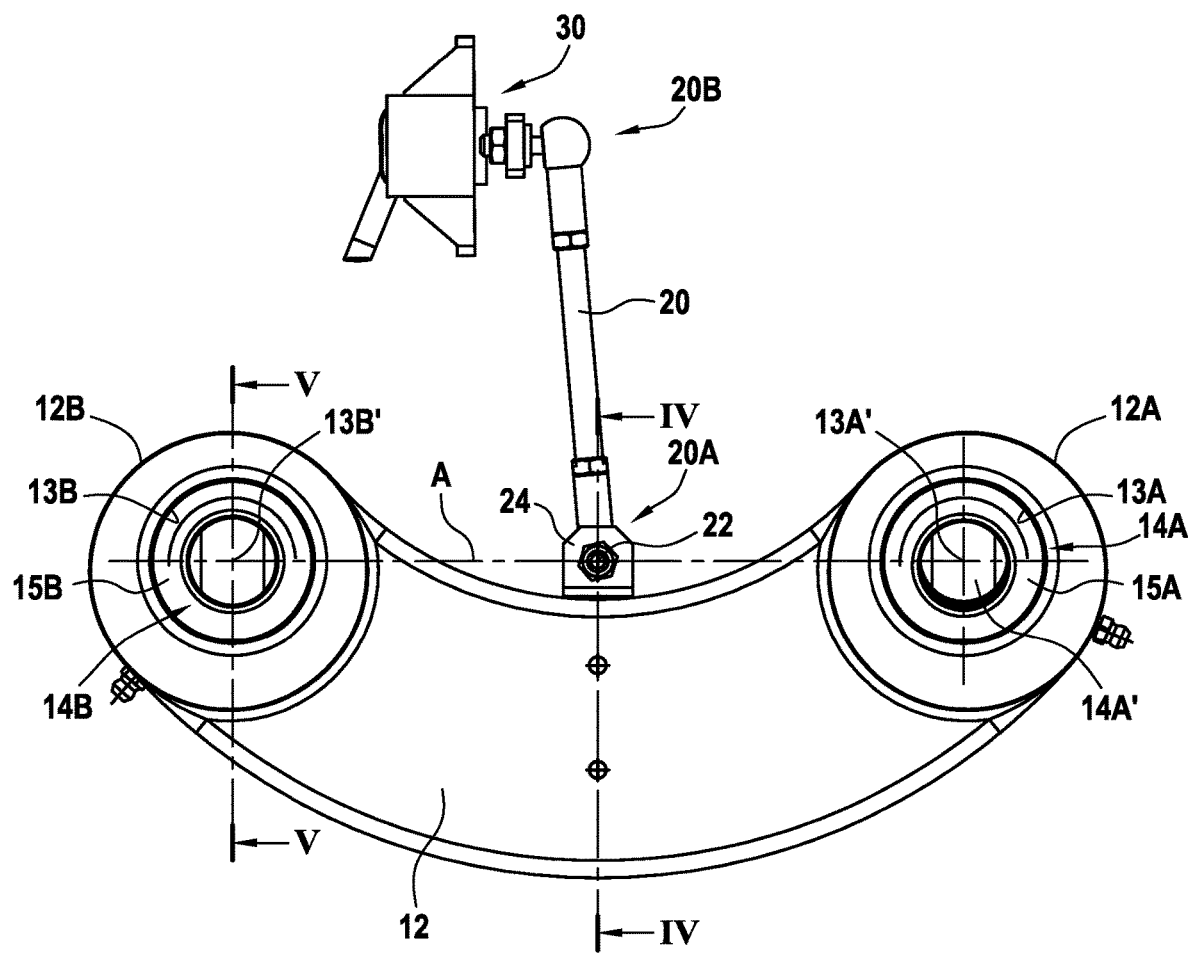
FIG. 3 is a front view of the vehicle suspension link device according to the disclosure.

As shown in particular in FIG. 3, the end 12A has a connection locus 13A for connection to the vehicle support structure. Similarly, the end 12B has a connection locus 13B for connection to the axle 2. Here, "connection locus", which may also be referred to as "connection site", refers to the location, in the link element, of the arrangement enabling the link element to be connected to the vehicle support structure or the axle, respectively. The locus may have a geometric center 13A', respectively 13B'.

In the example, the link element 12 is configured to be connected to the vehicle support structure 4 via a first spherical bearing 14A. The first connection locus 13A includes a hole portion at the first end 12A of the link element 12, the hole portion being provided with a spherical track for a spherical ball portion 15A. The spherical ball portion 15A of the spherical bearing 14A is provided with projecting rod portions 14A' and 14A", projecting from the spherical ball portion frontward and rearward, respectively. In particular, the projecting rod portions may be end portions of a rod arranged in a through hole of the ball portion 15A. The projecting rod portions 14A' and 14A" are for connection with supporting brackets of the vehicle support structure.

Figure 5:
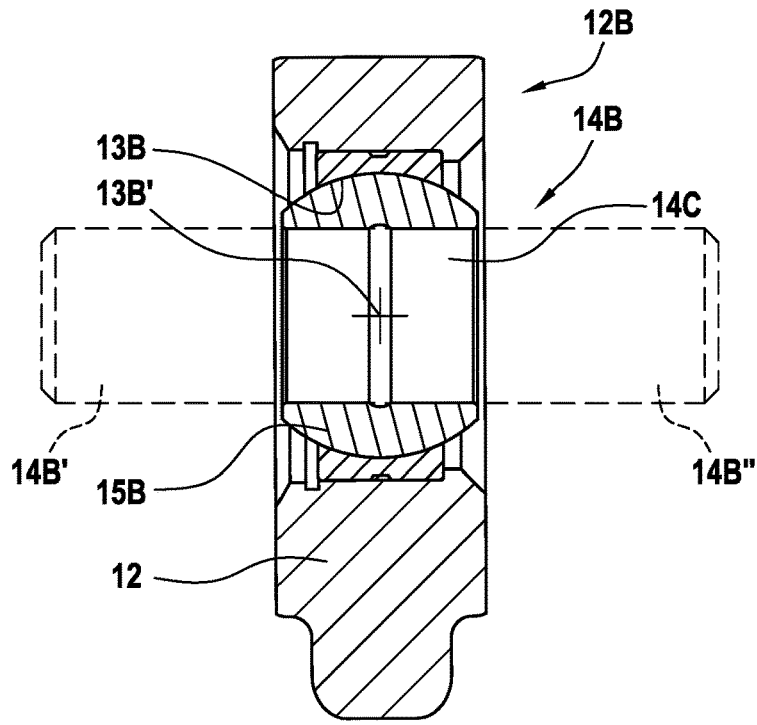
FIG. 5 is a section view, taken along the line V-V of FIG. 3.

The second connection locus or site 13B is similar to the first one 13A. It includes a hole portion at the second end 12B of the link element, the hole portion being provided with a spherical track for a spherical ball portion 15B of a second spherical bearing 14B, this spherical ball portion 15B being provided with projecting rod portions 14B' and 14B", best seen on FIG. 5, projecting from the spherical ball portion frontward and rearward, respectively. In this case, the projecting rod portions 15B', 15B" are end portions of a rod arranged fixed to a fixation part 14C arranged in a through hole of the ball portion 15B.

In the example, the respective centers 13A' and 13B' of the connection loci 13A and 13B are the centers of the spherical tracks of the respective spherical bearings 14A and 14B.

The projecting rod portions 14B' and 14B" are for connections with supporting brackets 14 fixed to the axle 2. More precisely, these rod portions are configured to be fixed to the brackets in releasable manner, for example in being engaged in holes of the brackets and secured therein by securing pins or the like. On the example, as best seen in FIG. 1, the end 12B of the link element 12 is sandwiched between upper portions of two analogous brackets 14 secured to the axle 2 at their lower portions. The projecting rod portions 14B' and 14B" engaged in holes at the upper portions of the brackets.

Similarly, the projecting rod portions 14A' and 14A" at the first connection locus 13A may engaged in brackets (not shown) similar to the brackets 14 and secured to the vehicle support structure 4.

The vehicle suspension link device of the embodiment includes a sensor element 20 for detecting a movement of the link element 12. The sensor element 20 is attached to the link element 12 at an attachment point 22. At best seen in FIG. 3, the attachment point 22 is located on a virtual axis A joining the first connection locus 13A and the second connection locus 13B. In the example, the virtual axis A passes through the respective geometric centers 13A' and 13B' of the connection loci 13A and 13B. Also, the attachment point 22 is arranged between the first connection locus 13A and the second connection locus 13B. In the example, the attachment point 22 is arranged in a central portion of the link element 12.

Figure 4:
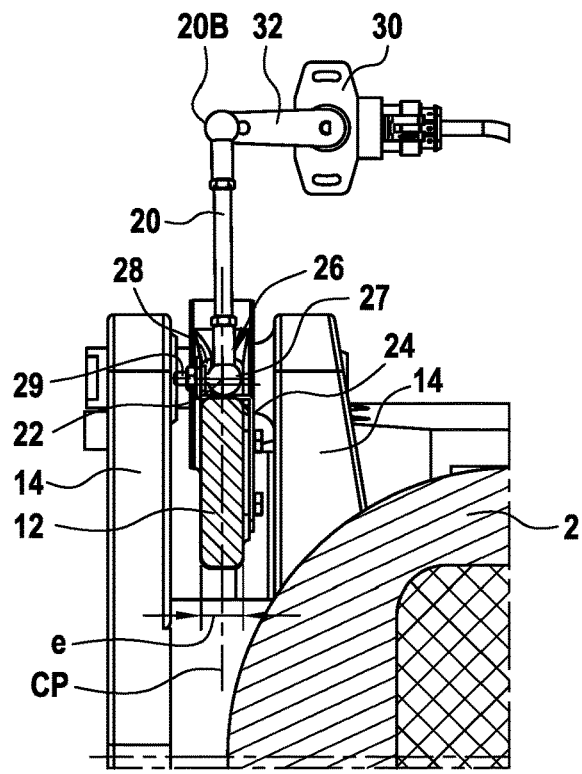
FIG. 4 is a side view with a section view, taken along the line IV-IV of FIG. 3.

As best seen in FIG. 4, the attachment point 22 is located on a bracket 24 secured to the link element 12. In the example, the bracket 24 is arranged so that the attachment point 22 is arranged in a median plane CP of the link element 22 perpendicular to the front-back direction FB. In other words, a thickness e of the link element 12 being measured in the direction FB, the attachment point 22 is arranged at half the thickness e. The bracket 24 may be formed by a sheet of metal fixed to a face of the link element 12 (here: the rear face) and bent or shaped so as to pass over the upper edge of the link element and allow for the attachment point to be arranged in the plane CP.

In this case, the centers 13A' and 13B' of the connection loci 13A and 13B are arranged on the same plane CP. The plane CP needs not be a central plane defining half the thickness e. It may be another plane perpendicular to the front-back direction, in which the connection loci of the link element and the attachment point 22 are located.

The sensor element 20 may be secured to the bracket 24 by any suitable means, in particular means allowing a releasable fixation, such as bolts or the like. The bracket 24 may be secured to the link element 12 by any suitable means, such as, for example, bolts or riveting.

In the example, the attachment point 22 of the sensor element 20 is at the center of a third spherical bearing 26. The third spherical bearing 26 includes a ball portion 27 fixedly connected to the sensor element 20 and movable in a spherical track 28 fixed to the bracket 24 by a bolt 29 or similar.

In the example, the sensor element 20 is a transmitting sensor element, which is caused to move due to a movement of the link element 12 so as to transmit such movement to a receiving sensor element 30, which measures the movement.

In the example, the sensor element 20 is a sensor rod, having a first end 20A attached to the link element 12 at the attachment point 22 and a second end 20B connected to the receiving sensor element 30. In the example, the receiving sensor element 30 is an angular sensor, to which the sensor element 20 is connected by a linkrod 32 in articulated manner.

The sensor element 20 formed by the sensor rod generally extends in a generally vertical plane and a vertical movement of the link element 12 causes the linkrod 32 to rotate. The angular sensor measures the angle covered by such rotation and, hence, the magnitude of the vertical movement of the link element 12.

In the example, the link element 12 has an arcuate shape the concavity of which is oriented upwardly.

Figures 6A, 6B:
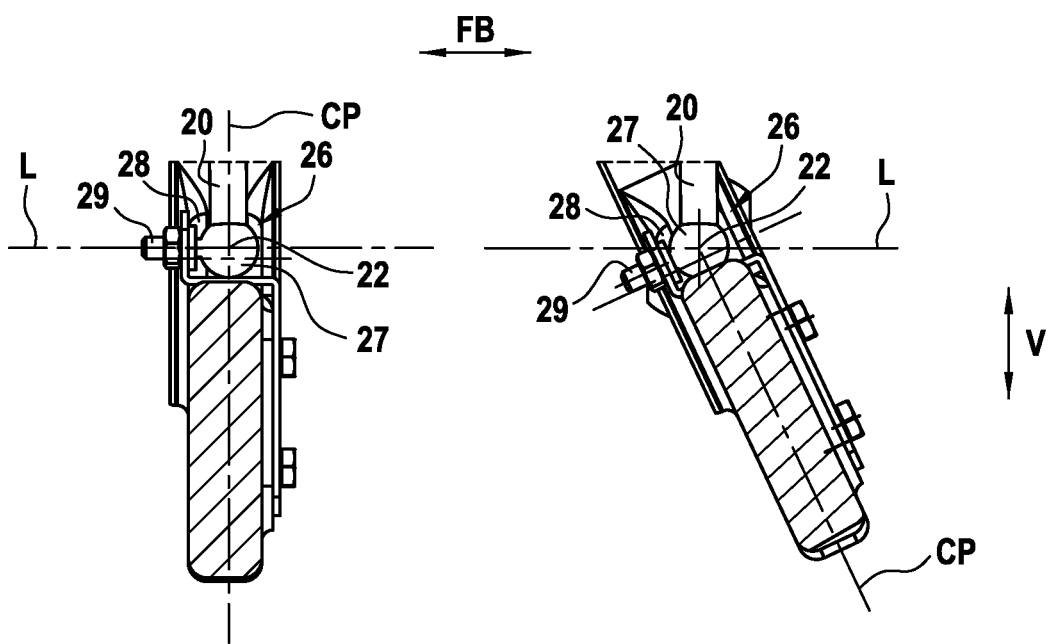
FIG. 6A is a section view of the suspension link device in a section taken along line IV-IV of FIG. 3, showing the link element in a usual, vertical, position.
FIG. 6B is a view similar to FIG. 6A, showing the link element in an undesired, inclined, position.

As best seen in FIG. 6A, the link element 12 is normally in a vertical position, the plane CP being parallel to a vertical direction V. However, the link element may be subject to undesired movements and, as seen in FIG. 6B, may thus be caused to rotate so that the above-mentioned plane CP be inclined with respect to the vertical direction V. Such undesired movements may be swinging movements about the virtual axis A. However, as shown in FIGS. 6A and 6B, the attachment point 22 of the sensor element 20 remains on the same horizontal line L in spite of such swinging movements. Hence, the undesired movement will not erroneously be taken into account in the measurements made by the sensor. On the contrary, the sensor will accurately measure the movements of the link element which are to be taken into consideration that is, in the example, the vertical movements.

The attachment point 22 may be generally located in the virtual axis A. Ideally, the centers of the three spherical bearings 14A, 14B and 26, that is the points 13A', 13B' and 22, are located on this axis. However, slight deviations may not have an heavy impact on the measurements made by the sensor. In particular, a device in which the distance from the attachment point to the axis would be less than 10% or, advantageously, less than 5% or 2% of the distance between the connection loci, would still be considered to be a device in which the attachment point in one the virtual axis.

The vehicle suspension link device of the disclosure has a rather compact link element, with secure connections to the vehicle support and the axle at the respective connection locus, while having a sufficiently large zone for attachment of the sensor element, and allowing such sensor element to be easily mounted. The sensor element may be a simple element, such as a rod, which is hardly subject to potential damage or wear.

The bracket 24 enables an easy mount of the link element. The arcuate shape of the link element 12 may resist to deformations, in particular buckling. The upwardly oriented concavity of the arcuate shape may allow an easy mount of the sensor element and enable the latter to have a sufficient length. The spherical bearings avoid heavy stress to be applied to the connections.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of the system may be transposed, alone or in combination, to a method and/or an apparatus and vice versa.

The invention claimed is:

1. A work vehicle comprising a vehicle support structure, a vehicle axle transverse to a vehicle traveling direction and a vehicle suspension link device comprising a link element, the link element being connected to the vehicle support structure at a first connection locus and being connected to the vehicle axle at a second connection locus, the work vehicle further comprising a sensor element for detecting a movement of the link element, the sensor element being attached to the link element at an attachment point located on a virtual straight axis joining the first connection locus and the second connection locus, wherein the vehicle axle has lateral ends provided with mounts mounting steering wheels.

2. The work vehicle as claimed in claim 1, further comprising an angular sensor for detecting a movement of the link element, the sensor element being connected to the angular sensor.

3. The work vehicle as claimed in claim 2, wherein the sensor element is a sensor rod, connected to the angular sensor by a linkrod, and wherein the angular sensor is configured to measure an angular movement of the linkrod.

4. The work vehicle as claimed in claim 1, wherein the link element is a panhard link.

5. The work vehicle as claimed in claim 1, wherein the attachment point is located between the first connection locus and the second connection locus.

6. The work vehicle as claimed in claim 1, wherein the sensor element is a transmitting sensor element caused to move due to a movement of the link element and configured to be connected to a receiving sensor element for transmitting a movement of said transmitting sensor element to said receiving sensor element.

7. The work vehicle as claimed in claim 1, comprising a bracket secured to the link element, the attachment point being located on the bracket.

8. The vehicle suspension link device as claimed in claim 1, wherein the link element presents an arcuate shape.

9. The work vehicle as claimed in claim 1, wherein the link element is configured to be connected to the vehicle support structure and to the vehicle axle, respectively, via respective first and second spherical bearings, respective centers of said first and second spherical bearings defining the first and the second connection locus, respectively.

10. The work vehicle as claimed in claim 9, wherein the sensor element is connected to the link element via a third spherical bearing, the attachment point of the sensor element being at a center of the third spherical bearing.

11. A work vehicle comprising a vehicle support structure, a vehicle axle transverse to a vehicle traveling direction and a vehicle suspension link device comprising a link element, the link element being connected to the vehicle support structure via a first spherical bearing having a first center and being connected to the vehicle axle via a second spherical bearing having a second center, the work vehicle further comprising a sensor element for detecting a movement of the link element, the sensor element being connected to the link element via a third spherical bearing having a third center, wherein the first center, the second center and the third center are aligned, wherein the vehicle axle has lateral ends provided with mounts mounting steering wheels.

12. The work vehicle according to claim 11, further comprising an angular sensor for detecting a movement of the link element, the sensor element being connected to the angular sensor.

13. The work vehicle according to claim 12, wherein the sensor element is a sensor rod, connected to the angular sensor by a linkrod, and wherein the angular sensor is configured to measure an angular movement of the linkrod.

14. A work vehicle comprising a vehicle support structure, a vehicle axle transverse to a vehicle traveling direction, suspension dampers connected to the vehicle axle and to the vehicle support structure, and a vehicle suspension link device comprising a link element, the link element being connected to the vehicle support structure via a first spherical bearing having a first center and being connected to the vehicle axle via a second spherical bearing having a second center, the work vehicle further comprising an angular sensor and a sensor element for detecting a movement of the link element, the sensor element being connected to the angular sensor and being connected to the link element via a third spherical bearing having a third center, wherein the first center, the second center and the third center are aligned, wherein the vehicle axle has lateral ends provided with mounts mounting steering wheels.

* * * * *